(12) United States Patent
Pallu De La Barriere

(10) Patent No.: US 6,264,877 B1
(45) Date of Patent: *Jul. 24, 2001

(54) METHOD OF MAKING A PART OF LARGE DIMENSIONS OUT OF COMPOSITE MATERIAL

(75) Inventor: Philippe Pallu De La Barriere, La Rochelle (FR)

(73) Assignee: Alternatives Energies, La Rochelle (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,302

(22) Filed: Mar. 11, 1998

(30) Foreign Application Priority Data

Mar. 12, 1997 (FR) .................................................. 97-02919

(51) Int. Cl.[7] .................................................. B29C 70/44
(52) U.S. Cl. .................... 264/516; 264/511; 264/512; 264/258; 264/314
(58) Field of Search .................... 264/257, 258, 264/314, 313, 324, 510, 511, 512, 516, 546

(56) References Cited

U.S. PATENT DOCUMENTS

| | | | |
|---|---|---|---|
| 2,155,375 | * | 4/1939 | Jablonsky .............................. 264/258 |
| 2,202,014 | * | 5/1940 | Lougheed .............................. 156/148 |
| 2,202,042 | * | 5/1940 | Blount .................................. 264/324 |
| 2,945,262 | * | 7/1960 | Petty .................................... 264/313 |
| 3,205,288 | * | 9/1965 | Bates .................................... 264/313 |
| 3,523,848 | * | 8/1970 | Huff et al. ............................ 264/512 |
| 4,169,749 | * | 10/1979 | Clark .................................... 264/314 |
| 4,268,571 | * | 5/1981 | McCarthy .............................. 428/236 |
| 4,335,182 | * | 6/1982 | Brand et al. ......................... 428/319.3 |
| 4,471,020 | * | 9/1984 | McCarthy .............................. 264/257 |
| 4,568,581 | * | 2/1986 | Peoples, Jr. .......................... 264/258 |
| 4,720,244 | * | 1/1988 | Kluppel et al. ....................... 416/224 |
| 5,037,599 | * | 8/1991 | Olson .................................... 264/510 |
| 5,041,182 | * | 8/1991 | Sekiguchi et al. .................... 264/258 |
| 5,087,187 | * | 2/1992 | Simkulak et al. .................... 264/258 |
| 5,156,786 | * | 10/1992 | Monroe ................................ 264/112 |
| 5,176,868 | * | 1/1993 | Davis .................................... 264/257 |
| 5,248,242 | * | 9/1993 | Lallo et al. ........................... 264/313 |
| 5,262,121 | * | 11/1993 | Goodno ................................ 264/313 |
| 5,462,408 | | 10/1995 | Coffy ................................. 416/134 A |
| 5,505,492 | * | 4/1996 | Nelson et al. ........................ 280/819 |
| 5,547,629 | * | 8/1996 | Diessen et al. ...................... 264/313 |
| 5,624,519 | * | 4/1997 | Nelson et al. ........................ 156/245 |
| 5,638,870 | * | 6/1997 | Takada et al. ........................ 138/125 |
| 5,876,054 | * | 3/1999 | Olson et al. ........................ 280/281.1 |

FOREIGN PATENT DOCUMENTS

| | | |
|---|---|---|
| 0 138 294 | 4/1985 | (EP) . |
| 0 358 510 | 3/1990 | (EP) . |
| 0 465 169 | 1/1992 | (EP) . |

OTHER PUBLICATIONS

Patent Abstracts of Japan, Toshiaki, et al., JP 04–201241, Jul. 22, 1992.
Derwent Publications, Ono et al., JP 6–228 837, Aug. 16, 1994.

* cited by examiner

Primary Examiner—Jan H. Silbaugh
Assistant Examiner—Stefan Staicovici
(74) Attorney, Agent, or Firm—Morrison & Foerster LLP

(57) ABSTRACT

A method of making a composite material part, in particular a wind turbine blade of great length, consists in placing a thickness of a cloth made up of threads comprising a mixture of polypropylene threads or fibers and of glass fibers or threads in two mold portions having the shape of the part that is to be made, placing an inflatable envelope on the cloth inside one of the mold portions, in closing the mold, in placing it in an enclosure fed with hot gas under pressure to melt the polypropylene of the cloth, thereby embedding the glass fibers or threads, then in allowing it to cool, and in unmolding.

7 Claims, 2 Drawing Sheets

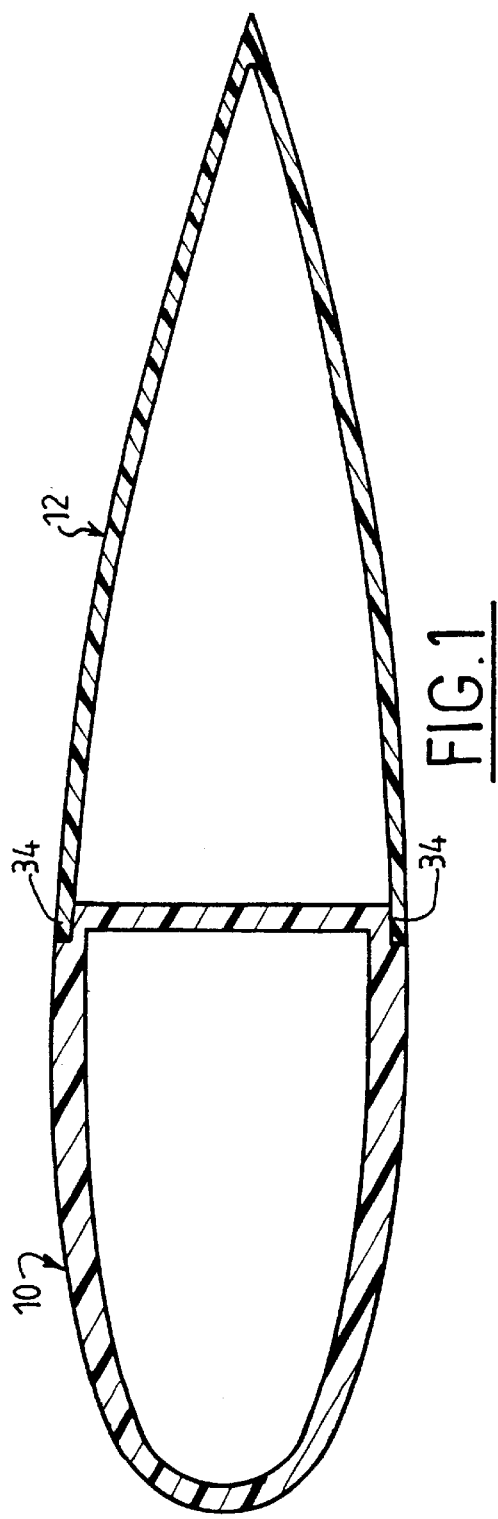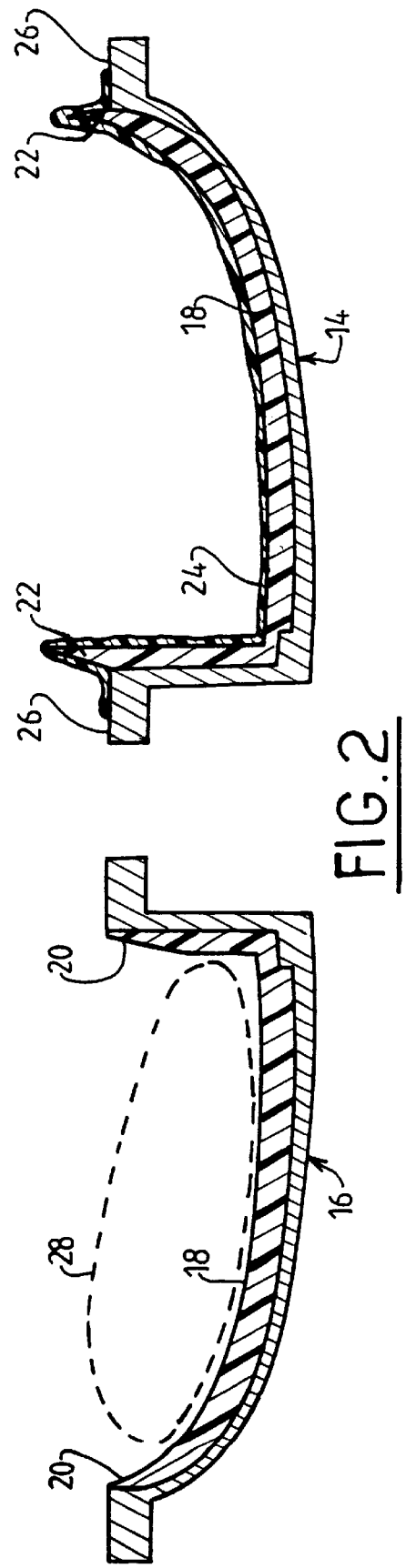

METHOD OF MAKING A PART OF LARGE DIMENSIONS OUT OF COMPOSITE MATERIAL

FIELD OF THE INVENTION

The invention relates to a method of using composite material to make a part of large dimensions, such as a propeller blade, and in particular a blade for a wind turbine.

The invention also relates, more generally, to any part made of composite material by performing the method, and in particular tubular or non-tubular parts of large dimensions such as beams, wings, and masts.

BACKGROUND OF THE INVENTION

Such parts are difficult, or even nearly impossible, to make using conventional injection molding techniques, since a mold cavity of great length (e.g. greater than 10 meters) presents serious technical problems when it comes to filling it with injected plastics material, and requires injection tooling that is too expensive for short manufacturing runs.

That is why parts of large size, such as the blades of a wind turbine, for example, have until now been made by a molding method which consists in depositing successive layers of resin in a mold on successive layers of fiberglass cloth or the like, each layer of resin needing to be polymerized (cold, using a catalyst) before the following layer of resin is deposited, because of the heat given off by the resin polymerizing. By way of example, this can make it necessary to deposit and polymerize ten layers of resin each having a thickness of 5 mm in order to build up a wall having a thickness of 50 mm. Under such conditions, making a single wind turbine blade of great length (about 15 meters (m) to 35 m) can occupy one mold for three to four weeks.

In addition, if a low cost resin is used such as a polyester resin, it is necessary to protect personnel against the toxic vapor given off by the resin while the part is being made. Naturally, it is possible to use an epoxy resin instead of a polyester resin in order to eliminate the risks of pollution and toxicity, but to the detriment of cost price, since the cost of epoxy resins is about five times greater than the cost of polyester resins.

It is already known, e.g. from U.S. Pat. No. 5,037,599, to make a part out of composite material starting from a cloth made up of threads that are constituted by a mixture of thermoplastic fibers and of reinforcing fibers, the cloth being placed or draped in a mold and being thermoformed by applying heat and pressure, the heat causing the thermoplastic of the cloth to melt and the pressure pressing it against the wall of the mold. Nevertheless, that known method does not enable tubular parts to be made.

OBJECTS AND SUMMARY OF THE INVENTION

A particular object of the present invention is to avoid the drawbacks of known methods.

The method provides a method which makes it possible to make parts of large dimensions in about one-third to one-fourth of the time required by the above-mentioned methods, and at a cost that is substantially the same as for parts made out of polyester resin, but without any risk of pollution or of toxicity.

To this end, the invention provides a method of making a part out of composite material, the method consisting in placing in a mold at least one thickness of cloth made up of threads constituted by a mixture of fibers or threads of thermoplastic material and of reinforcing fibers or threads, in placing an inflatable envelope on the cloth in the mold, in closing the mold and inflating said envelope to press the cloth against the wall of the mold, in heating the mold-plus-cloth together under pressure up to the melting temperature of the thermoplastic material to embed the reinforcing fibers or threads in said material, in allowing it to cool, and in unmolding, wherein the mold is made of two mold portions, comprising a first portion that can be shut down on a second portion, the cloth is placed inside each of the mold portions, a film of the above-mentioned thermoplastic material is placed on the cloth in the first mold portion which is suitable for shutting down on the second mold portion, with the film and the cloth being pressed against the wall of said mold portion by pressure reduction or suction, said first mold portion is closed down on the second mold portion, and the above-mentioned heating under pressure is performed.

This makes it possible to obtain a tubular part of large dimensions in a single molding and heating operation, unlike the prior technique where it was necessary to proceed layer by layer.

In addition, there is no need to polymerize the plastics material during the method, it suffices to heat a thermoplastic material that has already been polymerized.

According to another characteristic of the invention, heating is performed under pressure in a closed enclosure which is fed with hot gas under pressure (e.g. superheated steam or hot air under pressure).

Since the mold is open at one of its longitudinal ends, the same pressure obtains both inside and outside the mold, thus making it possible to distribute the molten plastics material uniformly around the reinforcing threads or fibers and to make a uniform matrix of plastics material in which the reinforcing threads or fibers are completely embedded.

According to another advantageous characteristic of the invention, the above-specified plastics material is polypropylene which has the advantage of being low in cost and of not giving off a polluting or harmful gas when heated and melted.

The invention also provides a propeller blade, in particular a wind turbine blade, made in two parts, a leading or "upstream" part and a trailing or "downstream" part relative to the direction of fluid flow over the blade when it is in rotation, said two parts being made by performing the method as defined above, and being fixed together by adhesive.

In a preferred embodiment of the invention, its leading portion is in the form of a box section member of closed cross-section, and the trailing portion of the blade is of open, substantially V-shaped cross-section.

The length of a wind turbine blade of the invention may be about 15 m to 35 m and it takes about one week to make, i.e. it is made in about one-third to one-fourth the time required in the prior art. It can also be made out of a low cost thermoplastic material, without any risk of pollution or of toxicity for the personnel involved in manufacture.

BRIEF DESCRIPTION OF THE DRAWINGS

The invention will be better understood and other characteristics, details, and advantages thereof will appear more clearly on reading the following description, given by way of example and made with reference to the accompanying drawings, in which:

FIG. 1 is a diagrammatic cross-section view through a wind turbine blade of the invention;

FIG. 2 is a diagram showing a first step in the method of molding the leading portion of the FIG. 1 blade;

MORE DETAILED DESCRIPTION

Figure 3:
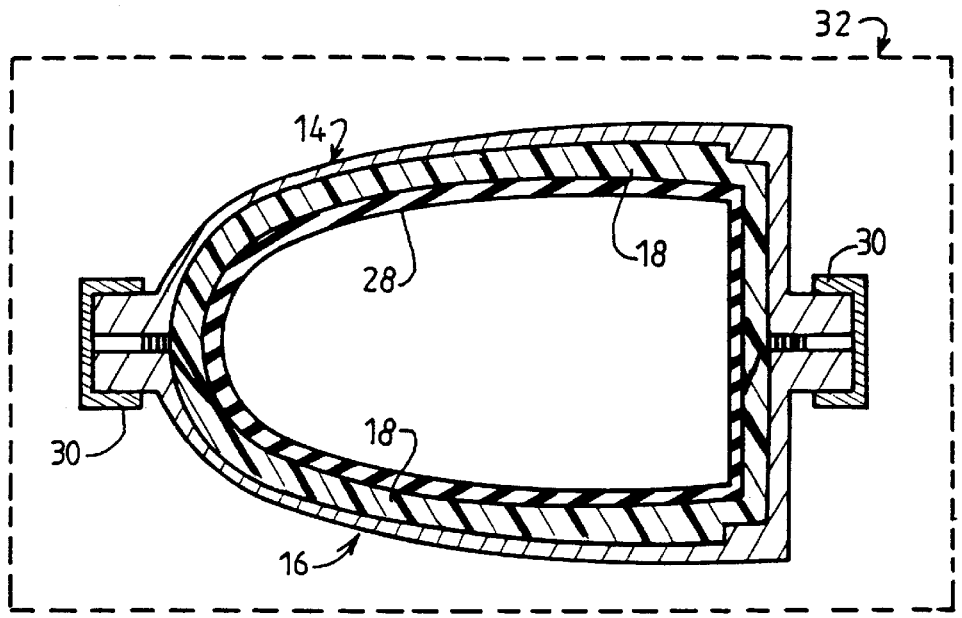
FIG. 3 is a diagram showing a second step in the method.

Reference is made initially to FIG. 1 which is a cross-section view through a wind turbine blade of the invention.

The blade is made up of two portions 10 and 12, the leading portion 10 i.e. the upstream portion relative to the flow direction of the fluid relative to the blade when it is in rotation, being in the form of a closed box section, while the trailing portion 12, i.e. the portion which is downstream relative to the flow direction of the fluid, has a cross-section that is substantially V-shaped and constitutes a fairing which is fixed to the trailing or downstream face of the leading portion 10, by means of adhesive.

Both portions 10 and 12 are made out of composite material by implementing the method of the invention, and the essential characteristics thereof are described below with reference to FIGS. 2 and 3 which relate to making the leading portion 10 of the blade.

The method of the invention makes use of a mold having two portions 14 and 16 (FIG. 2) a first one of which (14) is designed to be shut down on the second or other portion (16), handling means (not shown) being provided for this purpose.

In a first step of the method of the invention, the two mold portions 14 and 16 are in the position shown in FIG. 2 where their inside walls both face upwards so that one or more layers of a flexible cloth having threads made up of a mixture of threads or fibers of plastics material and of reinforcing threads or fibers, preferably of fiberglass, can be put into place inside each mold portion.

Such a cloth is presently available on the market and is constituted by threads made up of a mixture of polypropylene fibers or threads and glass fibers or threads, said cloth being in the form of a sheet of woven threads and also being available in multi-ply form.

One or more layers of the cloth 18 is thus put into place inside each of the mold portions 14 and 16, with the number of layers of cloth depending on the thickness desired for the wall of the part that is to be made. The layers of cloth 18 terminate level with the top edges of the second portion 16 of the mold and taper towards said edges, as shown at 20. In the first portion 14 of the mold that is to be shut down on the second portion, the edges of the layers of cloth 18 are allowed to project above the edges of said first mold portion 14, with the projecting edges tapering, as shown at 22. Thereafter, a film 24 of the same thermoplastic material as is used in the cloth (polypropylene) is put into place on the layers of cloth 18, said film 24 covering the layers of cloth 18 placed in the first mold portion 14, including the projecting edges 22 of said layers of cloth and the top edges 26 of the first mold portion 14.

Suction is established between the inside wall of the first mold portion 14 and the film 24, thereby holding the layers of cloth 18 and the film 24 against the inside wall of the first mold portion 14 and stiffening the edges 22 of the layers of cloth 18.

Thereafter, an inflatable envelope or balloon made of an elastically deformable and stretchable material such as an elastomer (e.g. a silicone elastomer) having appropriate mechanical strength and temperature-withstanding characteristics is placed on the layers of cloth 18 in the second mold portion 16.

A mandrel or some other core (not shown) can be placed inside the envelope or balloon 24 to prevent it collapsing completely when it is placed on the cloth 18 in the second mold portion 16.

The mold is enclosed by closing the first portion 14 down on the second portion 16, with the rims 26 of the two mold portions being held pressed one against the other as shown in FIG. 3 by any appropriate type of means, such as those shown diagrammatically at 30.

At this time, the envelope 28 may be inflated, at least in part, to keep the layers of cloth 18 in place inside the mold portions 14 and 16.

Thereafter, the mold is taken to an autoclave type heating and baking enclosure 32 to subject the thermoplastic material of the cloth 18 and of the film 24 to heating under pressure.

By way of example, the temperature and the pressure inside the enclosure 32 may be about 170° C. and about 2 bars, respectively, said temperature being sufficient to melt polypropylene and the pressure distributing the molten polypropylene around the glass fibers or threads of the cloth 18.

The time spent by the mold 14, 16 in the enclosure 32 may be about 5 hours, for example. The enclosure can be heated using superheated steam or indeed using hot air, in which case the pressure is delivered by a compressor external to the enclosure 32. The pressurized gas also serves to inflate the envelope 28.

Vent holes are formed through the mold portions 14 and 16 so as to enable any air held captive in the cloth 18 to be expelled.

Thereafter, it suffices to extract the mold 14, 16 from the enclosure 32 and to allow it to cool down to a temperature of about 40° C., after which the mold can be opened to unmold the leading or upstream portion 10 of the wind turbine blade.

The projecting edges 22 of the layers of cloth 18 in the first mold portion 14 have been pressed and welded against the tapering edges 20 of the layers of cloth 18 in the second mold portion 16, thereby automatically bonding together the two halves of the leading portion 10 of the blade.

In a variant, the projecting edges 22 of the layers of cloth 18 in the first mold portion 14 need not be formed, and instead it is possible to use a strip of cloth 18 which extends around the entire junction periphery between the two halves of the leading portion 10 of the blade, which strip is pressed against the tapering edges of the layers of cloth 18, and is held in place by the film 24 and the inflatable envelope 28.

This leading portion 10 is thus molded as a single piece, and as a result has mechanical characteristics that are considerably better than those of wind turbine blades made using the prior art technique described above.

The trailing or downstream portion 12 of the blade is made in the same way:

Layers of cloth 18 are placed in a mold having a V-shaped cross-section, an inflatable silicone balloon is placed in the mold, the mold is closed by means of an applied lid, and is then placed in the enclosure 32 to melt the polypropylene and to embed the glass fibers or threads in the melted polypropylene.

The two blade portions 10 and 12 are assembled together by adhesive at ambient temperature, the trailing edges of the upstream portion 10 being integrally molded with a setback that serves to house the leading edges 34 (FIG. 1) of the downstream portion 12.

A wind turbine blade made in this manner may be of a length lying in the range about 15 meters (m) to 35 m, and may weigh several (metric) tonnes. Its wall thickness is typically about 50 mm.

Figure 4:
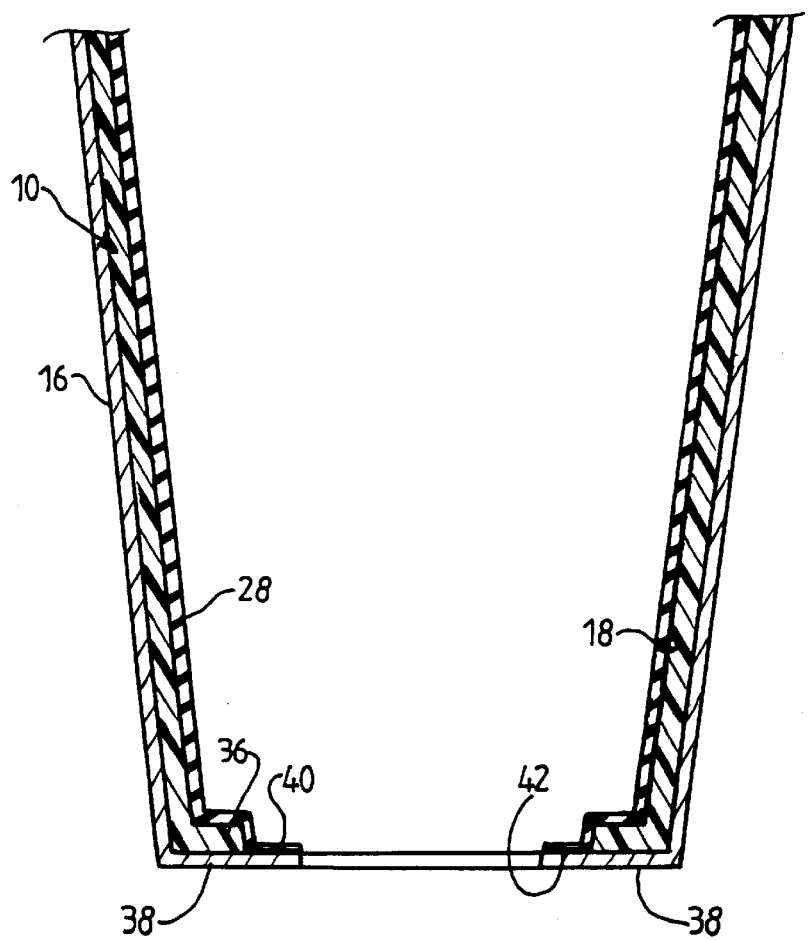
FIG. 4 is a diagrammatic longitudinal section view through one end of the FIG. 1 blade, including a flange for fixing to a rotor.

To fix the blade to the rotor of a wind turbine, one end of the leading portion 10 is integrally molded with an annular flange 36 (see FIG. 4) formed by an inwardly directed annular rim of layers of cloth 18 pressed against an annular rim 38 of the mold portions 14 and 16, with the inflatable balloon or envelope 28 likewise having an annular rim 40 that is pressed against the annular rim 38 of the mold portions 14 and 16, and with sealing material 42 being interposed between the above-mentioned rims 38 and 40.

After unmolding, it suffices to pierce holes through the rim 36 of the leading portion 10 of the blade to enable it to be fixed to the rotor of a wind turbine by means of bolts.

This avoids the use of an independent metal flange which would need to be fixed to the end of the blade by means of adhesive.

Naturally, the invention is applicable not only to making wind turbine blades as described and shown, but also to making any composite material part, and it presents significant advantages over competing techniques when used with short manufacturing runs.

What is claimed is:

1. A method of making a tubular or hollow part out of composite material comprising:

A) placing in a mold, having walls and first and second portions which have edges where the first and second portions close to form the mold, at least one thickness of cloth, which has mixture of fibers or threads of thermoplastic material and reinforcing fibers or threads, in each of the mold portions;

B) placing an inflatable envelope on at least one thickness of the cloth, each thickness having edges, in the mold;

C) placing a film of thermoplastic material, which thermoplastic material is the same as the thermoplastic fibers and threads, on at least one thickness of the cloth in the first mold portion and maintaining the cloth against the mold wall of the first mold portion by suction;

D) closing the mold;

E) inflating said envelope to press the thermoplastic film against at least one thickness of the cloth and the cloth against a wall of the mold;

F) heating under pressure up to the melting temperature of the thermoplastic material of the film and fibers or threads to embed the reinforcing fibers or threads in said material;

G) cooling the mold and fiber or thread embedded thermoplastic material; and

H) separating the mold into its two portions and obtaining the composite tubular or hollow part;

wherein the first mold portion closes on the second mold portion to form the mold for the tubular or hollow part.

2. A method according to claim 1, wherein the step of heating under pressure is performed in a closed enclosure fed with hot gas under pressure so that the same pressure and temperature are obtained both inside and outside the mold.

3. A method according to claim 1, wherein, during step A, a strip of cloth is placed so that a portion projects beyond the edges of the first mold portion, which causes said strip to be pressed against the cloth placed in the other portion of the mold when the envelope is inflated.

4. A method according to claim 1, wherein, during step A, a strip of cloth is placed on the edges of the layers of cloth placed in one of the portions of the mold so that said strip projects therefrom, which causes said strip of cloth to be pressed against the cloth placed in the other portion of the mold when the envelope is inflated.

5. A method according to claim 2, wherein the envelope is inflated by means of the hot gas under pressure fed into the enclosure.

6. A method according to claim 1, wherein the thermoplastic material is polypropylene.

7. A method according to claim 1, wherein the cloth is pressed against the wall of said mold portion and the film is pressed against at least one layer of cloth by pressure reduction or suction.

* * * * *